United States Patent
Chen

(10) Patent No.: US 8,610,707 B2
(45) Date of Patent: Dec. 17, 2013

(54) THREE-DIMENSIONAL IMAGING SYSTEM AND METHOD

(75) Inventor: Ying-Ru Chen, Tainan (TW)

(73) Assignee: Himax Technologies Ltd., Tainan County (TW)

( * ) Notice: Subject to any disclaimer, the term of this patent is extended or adjusted under 35 U.S.C. 154(b) by 533 days.

(21) Appl. No.: 12/875,744

(22) Filed: Sep. 3, 2010

(65) Prior Publication Data

US 2012/0056871 A1 Mar. 8, 2012

(51) Int. Cl.
*G06T 15/00* (2011.01)
*H04N 13/00* (2006.01)
(52) U.S. Cl.
USPC ............ 345/419; 348/E13.001; 348/E13.003; 348/E13.008
(58) Field of Classification Search
None
See application file for complete search history.

(56) References Cited

U.S. PATENT DOCUMENTS

2008/0100613 A1* 5/2008 Woo et al. ..................... 345/419
2009/0322858 A1* 12/2009 Mitsuya et al. ................. 348/43

OTHER PUBLICATIONS

Pourazad, "Generating the Depth Map from the Motion Information of H.264-Encoded 2D Video Sequence", Apr. 19, 2010, EURASIP Journal on Image and Video Processing 2010, Article ID 108584.*
Hodges, "Stereo and Alternating-Pair Techniques for Display of Computer-Generated Images", Sep. 1985, North Carolina State University.*

* cited by examiner

*Primary Examiner* — Tize Ma
(74) *Attorney, Agent, or Firm* — Muncy, Geissler, Olds & Lowe, PLLC

(57) ABSTRACT

A three-dimensional (3D) imaging system and method are disclosed. A motion estimation and motion compensation (MEMC) unit performs the motion estimation (ME) and the motion compensation (MC) on a reference frame and a current frame, thereby generating an MEMC generated frame and motion vector (MV) information. A depth controller partitions the reference frame into multiple regions according to the MV information, thereby generating depth information. A scene-mode depth generator generates a depth map according to the reference frame and the depth information. A depth-image-based rendering (DIBR) unit generates a scene-mode generated frame according to the reference frame and the depth map.

12 Claims, 3 Drawing Sheets ic System and Method

THREE-DIMENSIONAL IMAGING SYSTEM AND METHOD

BACKGROUND OF THE INVENTION

1. Field of the Invention

The present invention generally relates to digital image processing, and more particularly to a three-dimensional (3D) imaging system and method.

2. Description of Related Art

When three-dimensional (3D) objects are mapped onto a two-dimensional (2D) image plane by prospective projection, such as an image taken by a still camera or a video camera, a lot of information, particularly 3D depth information, disappears. A 3D imaging system, however, can convey 3D information to a viewer by recording 3D visual information or by re-creating the illusion of depth. Although the 3D imaging technique has been known for over a century, the 3D display becomes more practical and popular owing to availability of high-resolution and low-price displays such as liquid crystal displays (LCDs).

Conventional 3D imaging systems use 2D-to-3D technique to create the illusion of depth according to original 2D images. However, the motion and stillness of objects in the 2D image have distinct effect on the performance of the 2D-to-3D transformation respectively. Unfortunately, the conventional 3D imaging systems are incapable of adapting to the distinct situations. Therefore, a need has arisen to propose a novel adaptive 3D imaging system that is capable of performing 2D-to-3D imaging adaptable to characteristics of the images.

SUMMARY OF THE INVENTION

In view of the foregoing, it is an object of the embodiment of the present invention to provide a 3D imaging system and method that is adaptable to distinct characteristics of images.

According to one embodiment, a three-dimensional (3D) imaging system includes a motion estimation and motion compensation (MEMC) unit, a depth controller, a scene-mode depth generator and a depth-image-based rendering (DIBR) unit. The MEMC unit is configured to perform the motion estimation (ME) and the motion compensation (MC) on a reference frame and a current frame, thereby generating an MEMC generated frame and motion vector (MV) information, wherein the reference frame is displayed as a first 3D image. The depth controller is configured to partition the reference frame into multiple regions according to the MV information, thereby generating depth information. The scene-mode depth generator is configured to generate a depth map according to the reference frame and the depth information. The DIBR unit is configured to generate a scene-mode generated frame for a second 3D image according to the reference frame and the depth map.

DETAILED DESCRIPTION OF THE INVENTION

Figure 1:
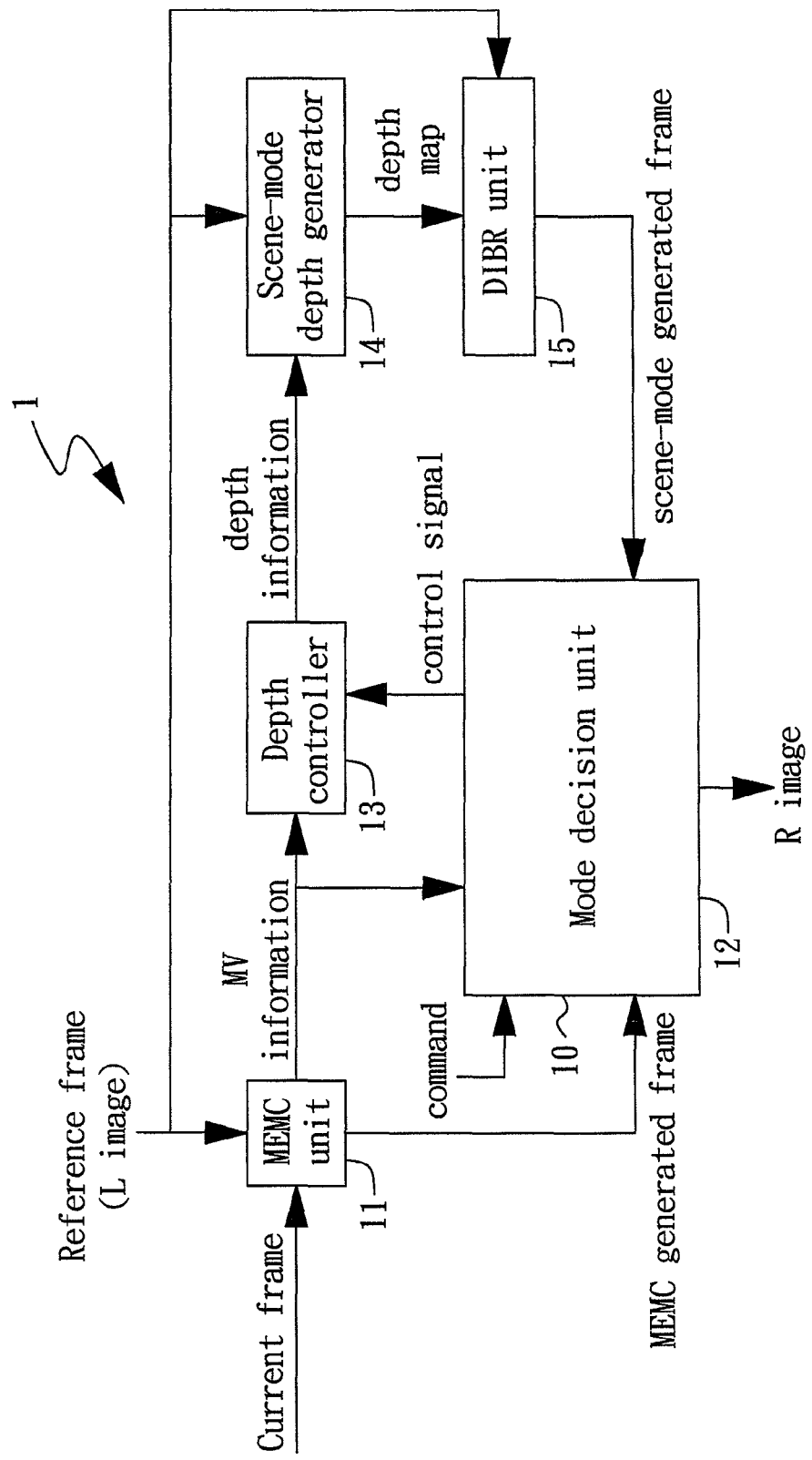
FIG. 1 shows a block diagram that illustrates a three-dimensional (3D) imaging system according to one embodiment of the present invention.

FIG. 1 shows a block diagram that illustrates a three-dimensional (3D) imaging system 1 according to one embodiment of the present invention. In the embodiment, the imaging system 1 may perform in one of three modes: a motion estimation/motion compensation (MEMC) mode, a scene mode and a hybrid mode. The mode may be selected, for example, by a command issued by a user to a mode decision unit 10.

Figures 2, 3A, 3B:
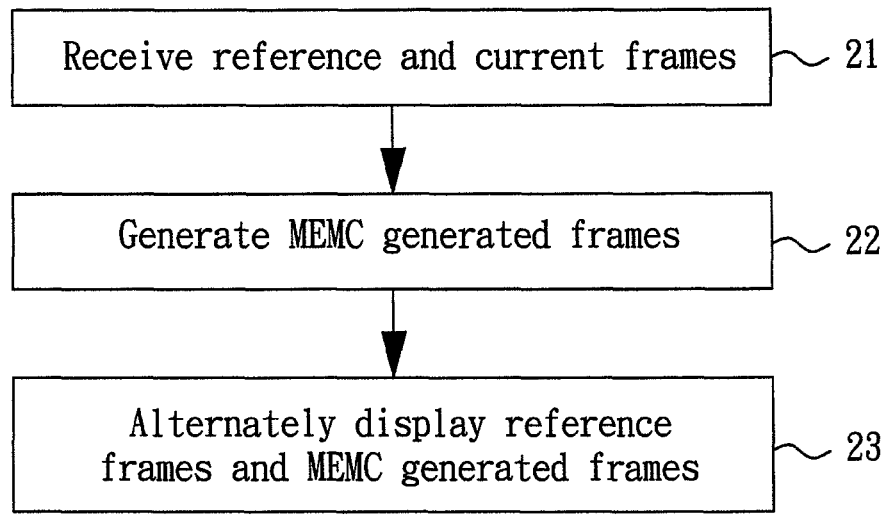
FIG. 2 shows a flow diagram of the first mode (or an MEMC mode) according to the embodiment of the present invention.
FIG. 3A shows an exemplary sequence of frames inserted with the MEMC generated frames in the first mode.
FIG. 3B shows exemplary sequences of the right images and the left images fed to a 3D display in the first mode.

FIG. 2 shows a flow diagram of the first mode (i.e., the MEMC mode) according to the embodiment of the present invention. An MEMC unit 11 (FIG. 1) receives a reference frame (e.g., a previous frame) and a current frame (step 21), and then performs motion estimation (ME) and motion compensation (MC) on the received frames. As a result, in step 22, an MEMC generated frame (or interpolated frame) is thus generated from the MEMC unit 11. The MEMC unit 11 may be implemented by conventional frame rate up-conversion (FRUC) technique. FIG. 3A shows an exemplary sequence of frames (e.g., $F_t$, $F_{t+1}$ and $F_{t+2}$) inserted with the MEMC generated frames (e.g., $F_{t+0.5}$ and $F_{t+1.5}$). Subsequently, the reference frames and the MEMC generated frames are displayed alternately or simultaneously, for example, by a 3D display, as left (L) images and right (R) images respectively (step 23). In other words, each reference frame alternates with its associated MEMC generated frame for the 3D display with shutter glasses. Each reference frame combines with its associated MEMC generated frame for the 3D display with polarization, red/cyan glasses or bare eye. FIG. 3B shows exemplary sequences of the right images and the left images fed to the 3D display. Although the reference frames are displayed as the left images and the MEMC generated frames are displayed as the right images in the example, it is appreciated that the reference frames and the MEMC generated frames may be displayed in the opposite way. Generally speaking, the reference frames are displayed as the first 3D images (e.g., the left images) and the MEMC generated frames are displayed as the second 3D images (e.g., the right images). The right images are fed to the 3D display via the mode decision unit 10.

Figure 4:
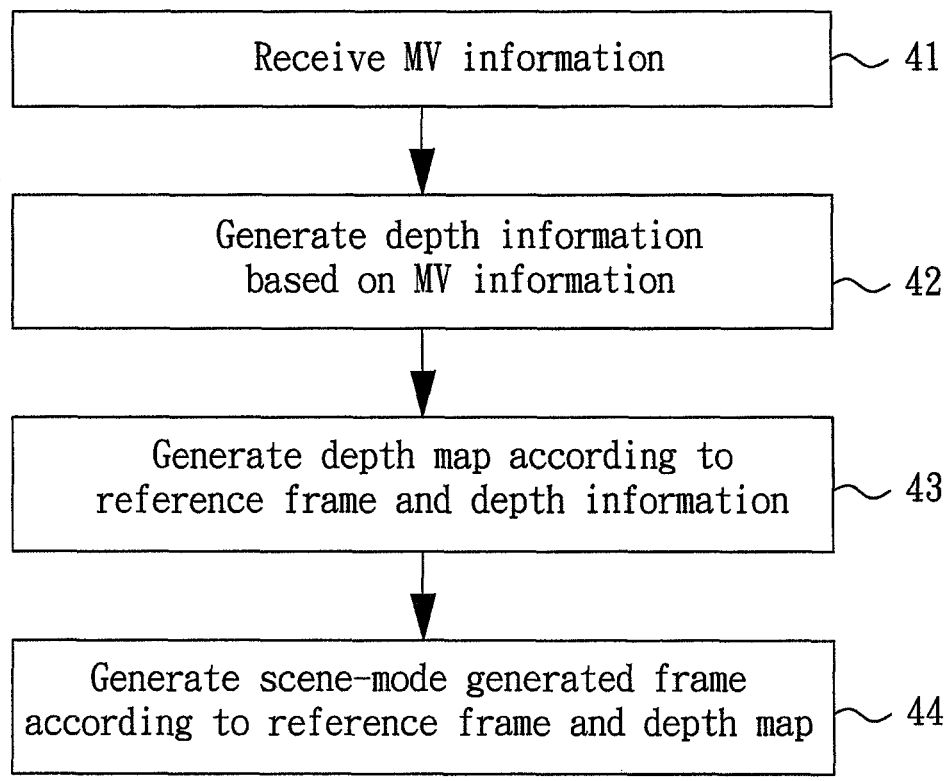
FIG. 4 shows a flow diagram of the second mode (or a scene mode) according to the embodiment of the present invention.

FIG. 4 shows a flow diagram of the second mode (i.e., the scene mode) according to the embodiment of the present invention. A depth controller 13 (FIG. 1) receives motion vector (MV) distribution information (or "MV information" for short) generated from the MEMC unit 11 (step 41). In the embodiment, the depth controller 13 may be activated or inactivated by a control signal generated from the mode decision unit 10 according to the MV information. For example, the depth controller 13 may be inactivated when the MV information indicates that the current frame is still corresponding to the reference frame, for example, every MV is substantially zero. Based on the received MV information, the activated depth controller 13 may partition the reference frame into multiple regions such as a foreground object and a background, therefore generating depth information (step 42). For example, the region with non-zero MV may be the foreground object and the region with zero MV may be the background. For example, the background should be assigned depth that monotonically increases from the bottom to the top, while the foreground object should be assigned the same depth that is nearer to a viewer than the background depth. The depth information from the depth controller 13 assists the scene-mode depth generator to obtain a reliable/exact depth map for the reference frame.

Subsequently, in step 43, a scene-mode depth generator 14 (FIG. 1) generates a depth map according to the reference frame and the depth information from the depth controller 13. The reference frame and the generated depth map are then fed to a depth-image-based rendering (DIBR) unit 15, which generates (or synthesizes) a scene-mode generated frame as a right (R) image according to the reference frame and the depth map (step 44). The DIBR unit 15 may be implemented by a suitable conventional technique, for example, disclosed in a disclosure entitled "A 3D-TV Approach Using Depth-Image-Based Rendering (DIBR)," by Christoph Fehn, the disclosure of which is hereby incorporated by reference. Conceptually, as described in this disclosure, the DIBR performs the following two-step process: at first, the original image points are re-projected into a 3D space (i.e., 2D-to-3D), utilizing the respective depth data; secondly, the 3D space points are projected into an image plane or planes (i.e., 3D-to-2D), which are located at the required viewing position respectively. The DIBR unit 15 may be implemented by hardware, software or their combination. Finally, the reference frames are displayed as the first 3D images (e.g., the left images) and the scene-mode generated frames are displayed as the second 3D images (e.g., the right images). The right images are fed to the 3D display via the mode decision unit 10.

Figure 5:
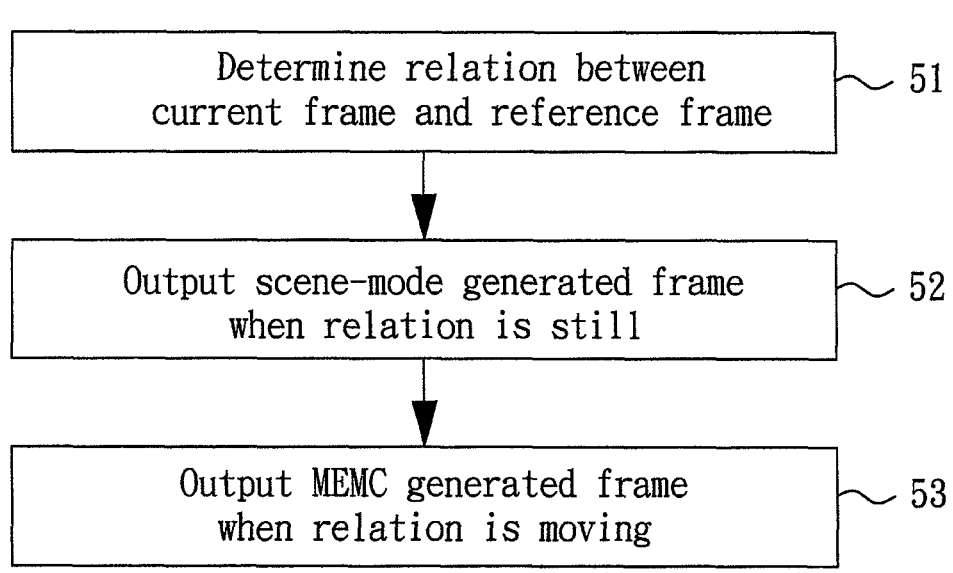
FIG. 5 shows a flow diagram of the third mode (or a hybrid mode) according to the embodiment of the present invention.

FIG. 5 shows a flow diagram of the third mode (i.e., the hybrid mode) according to the embodiment of the present invention. In the third mode, based on the MV information, the mode decision unit 10 determines the relation between the current frame and the reference frame (step 51). For example, when the MV information indicates that the relation between the current frame and the reference frame is substantially standing still with small or zero MV, the mode decision unit 10 accordingly inactivates the depth controller 13 via the control signal in order to generate the scene-mode generated frame, which is then outputted through the mode decision unit 10 as the right image (step 52). On the other hand, when the MV information indicates that the relation between the current frame and the reference frame is substantially moving with non-zero or substantive (e.g., greater than a predetermined threshold) MV, the mode decision unit 10 accordingly inactivates the depth controller 13 via the control signal, and the MEMC generated frame is then outputted through the mode decision unit 10 as the right image (step 53).

With respect to the 3D imaging system 1 described above, each mode and its associated function blocks may be individually implemented. For example, a 3D imaging system realizing the first mode may be implemented with only the MEMC unit 11 to generate the MEMC generated frame as the right image. In another example, a 3D imaging system realizing the second mode may be implemented with only the depth controller 13, the scene-mode depth generator 14 and the DIBR unit 15 to generate the scene-mode generated frame as the right image.

Although specific embodiments have been illustrated and described, it will be appreciated by those skilled in the art that various modifications may be made without departing from the scope of the present invention, which is intended to be limited solely by the appended claims.

What is claimed is:

1. A three-dimensional (3D) imaging system, comprising:
a motion estimation and motion compensation (MEMC) unit configured to perform the motion estimation (ME) and the motion compensation (MC) on a reference frame and a current frame, thereby generating an MEMC generated frame and motion vector (MV) information, wherein the reference frame is displayed as a first 3D image;
a depth controller configured to partition the reference frame into multiple regions according to the MV information, thereby generating depth information;
a scene-mode depth generator configured to generate a depth map according to the reference frame and the depth information;
a depth-image-based rendering (DIBR) unit configured to generate a scene-mode generated frame for a second 3D image according to the reference frame and the depth map; and
a mode decision unit activated or inactivated the depth controller according to the MV information;
wherein the mode decision unit outputs one of the MEMC generated frame and the scene-mode generated frame as the second 3D image;
wherein the mode decision unit outputs the scene-mode generated frame as the second 3D image when the MV information indicates that a relation between the current frame and the reference frame is substantially standing still; otherwise, the mode decision unit outputs the MEMC generated frame as the second 3D image.

2. The system of claim 1, wherein the MEMC generated frame is interpolated between the reference frame and the current frame.

3. The system of claim 1, wherein the scene-mode depth generator assigns a foreground object in the reference frame with a depth value nearer to a viewer than a depth value of a background according to the depth information.

4. The system of claim 1, wherein the mode decision unit inactivates the depth controller if the MV information indicates that a relation between the current frame and the reference frame is substantially standing still; otherwise the mode decision unit activates the depth controller.

5. The system of claim 1, wherein the mode decision unit outputs one of the MEMC generated frame and the scene-mode generated frame according to a command.

6. The system of claim 1, wherein the mode decision unit inactivates the depth controller when the mode decision unit outputs the MEMC generated frame as the second 3D image.

7. A three-dimensional (3D) imaging method, comprising:
performing motion estimation (ME) and motion compensation (MC) on a reference frame and a current frame, thereby generating an MEMC generated frame and motion vector (MV) information, wherein the reference frame is displayed as a first 3D image;
partitioning the reference frame into multiple regions according to the MV information, thereby generating depth information;
generating a depth map according to the reference frame and the depth information;
generating a scene-mode generated frame for a second 3D image according to the reference frame and the depth map by depth-image-based rendering (DIBR); and
activating or inactivating partitioning the reference frame according to the MV information;
wherein one of the MEMC generated frame and the scene-mode generated frame is outputted as the second 3D image;
wherein the scene-mode generated frame is outputted as the second 3D image when the MV information indicates that a relation between the current frame and the reference frame is substantially standing still; otherwise, the MEMC generated frame is outputted as the second 3D image.

8. The method of claim 7, wherein the MEMC generated frame is interpolated between the reference frame and the current frame.

9. The method of claim 7, wherein a foreground object in the reference frame is assigned a depth value nearer to a viewer than a depth value of a background according to the depth information.

10. The method of claim 7, wherein the inactivating step is performed if the MV information indicates that a relation between the current frame and the reference frame is substantially standing still; otherwise the activating step is performed.

11. The method of claim 7, wherein one of the MEMC generated frame and the scene-mode generated frame is outputted according to a command.

12. The method of claim 7, further comprising a step of inactivating the step of partitioning the reference frame when the MEMC generated frame is outputted as the second 3D image.

\* \* \* \* \*